United States Patent
Rumpf

(10) Patent No.: US 6,849,816 B2
(45) Date of Patent: Feb. 1, 2005

(54) VEHICLE STEERING WHEEL

(75) Inventor: Dieter Rumpf, Rödermark (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/692,218

(22) Filed: Oct. 23, 2003

(65) Prior Publication Data

US 2004/0089527 A1 May 13, 2004

(30) Foreign Application Priority Data

Oct. 30, 2002 (DE) .......................... 202 16 793
Jun. 20, 2003 (DE) .......................... 203 09 521

(51) Int. Cl.$^7$ ............................................. H01H 9/00
(52) U.S. Cl. .................... 200/61.54; 200/61.57; 280/731
(58) Field of Search ................... 200/61.54, 61.55, 200/61.85, 61.57; 280/731, 728.3

(56) References Cited

U.S. PATENT DOCUMENTS

| 4,518,836 | A | * | 5/1985 | Wooldridge | 200/61.54 |
| 4,590,340 | A | * | 5/1986 | Koike et al. | 200/61.54 |
| 4,872,364 | A | * | 10/1989 | Kaga et al. | 74/484 H |
| 5,303,952 | A | * | 4/1994 | Shermetaro et al. | 280/731 |
| 5,627,352 | A | * | 5/1997 | Suzuki et al. | 200/61.54 |
| 5,756,950 | A | * | 5/1998 | De Filippo | 200/61.54 |
| 6,225,578 | B1 | * | 5/2001 | Kobayashi et al. | 200/5 R |
| 6,349,616 | B1 | * | 2/2002 | Onodera et al. | 74/552 |
| 6,426,473 | B1 | | 7/2002 | Derrick et al. | |
| 6,501,035 | B2 | * | 12/2002 | Takahashi | 200/61.54 |

FOREIGN PATENT DOCUMENTS

| DE | 19956872 | 6/2001 |
| EP | 1164054 | 12/2001 |

* cited by examiner

Primary Examiner—Kyung Lee
(74) Attorney, Agent, or Firm—Tarolli, Sundheim, Covell & Tummino L.L.P.

(57) ABSTRACT

A vehicle steering wheel comprises a first switch (2) and a first actuating element (4) for actuating the first switch, and a second switch (132) and a second actuating element (110) for actuating the second switch. There is further provided a carrier (134) adapted to be displaced by the second actuating element (110) in an actuating direction (B) for actuating the second switch (132) and on which the first switch (2) is mounted. The steering wheel also has a base body (122), relative to which the carrier (134) is mounted so as to be displaceable in said actuating direction (B). The first actuating element (4) is provided with a stop element (9) which abuts against the base body (122) when the first actuating element (110) is displaced up to a complete actuation of the first switch (2). The stop element also prevents a displacement of the carrier (134), leading to the actuation of the second switch (132), by means of the first actuating element (4).

13 Claims, 3 Drawing Sheets

VEHICLE STEERING WHEEL

TECHNICAL FIELD

The invention relates to a vehicle steering wheel.

BACKGROUND OF THE INVENTION

Conventional steering wheels normally have switches and actuating elements for actuating the switches. These switches can, for example, be a horn contact switch and multifunction switch, for triggering the horn or for controlling functions such as on-board computer, radio etc. from the steering wheel.

For a simple production of the vehicle steering wheel, the switches are frequently arranged on a common moving part, preferably on a carrier in the form of a printed circuit board. For example, on a so-called "floating horn" gas bag module, with which the majority of vehicle steering wheels are equipped nowadays. This is designated in this way because the entire gas bag module is displaceably mounted in the axial direction of the steering wheel and, for triggering the horn, can be moved by pressing the covering of the gas bag module, in order to actuate the horn contact switch. As the multifunction switches are likewise arranged on the gas bag module, it can happen that with firm pressing of a multifunction switch the horn is triggered unintentionally.

In order to avoid this unintended actuation, several solutions have already been proposed. One solution consists in arranging the multifunction switches in such a way that they are actuated in a direction different from that of the horn. However, this means a restriction to the operating comfort and requires compromises in the designer's construction of the gas bag module. Another solution consists in uncoupling the movement between the multifunction switch and the horn by separate carriers for the two switches. This is a costly solution, however, which requires additional components, wiring and installation work. A further, electronic solution can be achieved by a logic linking of the switches, with in the simplest case the circuit of the horn being interrupted on actuation of the multifunction switches. Of course, this has the consequence that the horn is not available at all times, which is not acceptable.

BRIEF SUMMARY OF THE INVENTION

The invention provides a simple and reliable solution to the above-mentioned problem in the form of a vehicle steering wheel. According to the invention, a vehicle steering wheel comprises a first switch and a first actuating element for actuating the first switch, and a second switch and a second actuating element for actuating the second switch. There is further provided a carrier adapted to be displaced by the second actuating element in an actuating direction for actuating the second switch and on which the first switch is mounted. The steering wheel also has a base body, relative to which the carrier is mounted so as to be displaceable in said actuating direction. The first actuating element is provided with a stop element which abuts against the base body when the first actuating element is displaced up to a complete actuation of the first switch. The stop element also prevents a displacement of the carrier caused by the first actuating element, which displacement would lead to the actuation of the second switch. The stop element makes provision that a so-called "over-pressing" (an excessive pressing down leading to an unintentional, simultaneous actuation of the switches) of the first actuating element, i.e. for example of a button for a multifunction switch, is no longer possible. If, on the other hand, with a pressed multifunction button the second actuating element, i.e. for example the button for triggering the horn, is actuated, the common carrier can move to actuate the horn contact switch, whilst the multifunction button remains prevented from a further movement by the stop element. Thereby, an unintentional actuation of the second switch with an actuation of the first switch is ruled out.

According to an advantageous embodiment, the carrier has an upper side and an underside, the first switch being arranged on the upper side and the second switch being arranged on the underside. This leads to a particularly compact, space-saving construction, in which both switches are jointly on one carrier. The two switches can be arranged directly one over the other, which makes possible a simplified and short lead run.

According to a preferred embodiment, the second actuating element is a gas bag module (floating horn gas bag module) mounted displaceably in the vehicle steering wheel, and the second switch is a horn contact switch. Thereby, the entire surface of the gas bag module can be used as actuating surface for triggering the horn. Therefore, a rapid actuation of the horn in a hazard situation is possible.

According to a further advantageous embodiment, the first actuating element is displaceably mounted on a lateral extension of the gas bag module. In this way, the first and second actuating elements form a common mounting unit which can be prefabricated and is adapted to be installed in a simple manner into the vehicle steering wheel.

Further advantageous embodiments will be apparent from the sub-claims.

DETAILED DESCRIPTION OF THE PREFERRED EMBODIMENT

Figure 1:
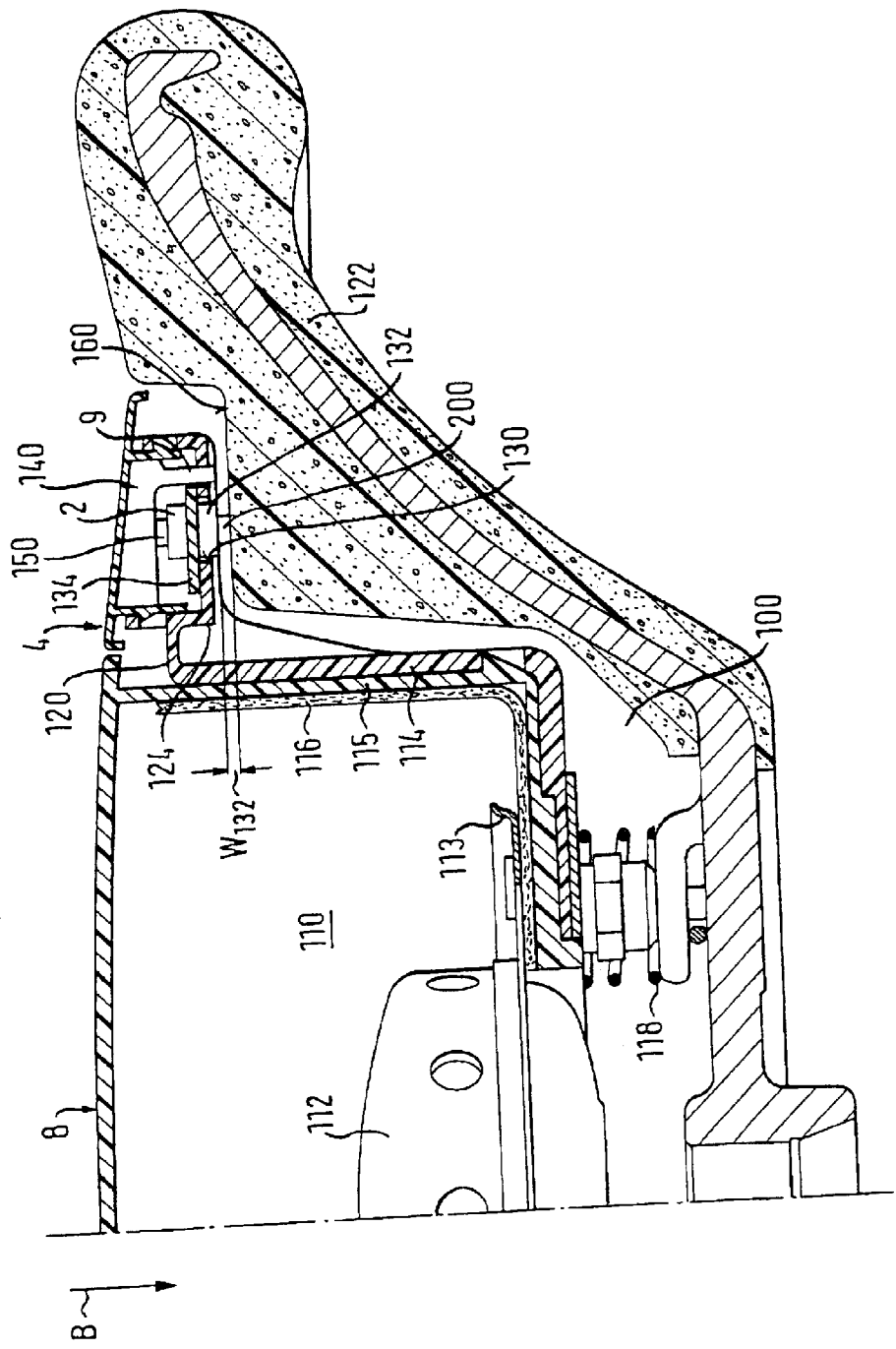
FIG. 1 shows the right-hand half of a steering wheel according to the invention, in cross-section, neither the horn nor the multifunction switch unit being pressed.

In FIG. 1 a vehicle steering wheel is illustrated with a steering wheel skeleton 122 encased in foam, and with a floating horn gas bag module 110. The steering wheel skeleton 122 forms a base body and is equipped with a cup-shaped recess 100 in which the gas bag module 110 is displaceably mounted in the direction parallel to the longitudinal axis of the steering wheel indicated in FIG. 1 by arrow B.

The gas bag module 110 has a trough-shaped, upwardly open module housing 114, in which a container 115 is provided. The surface of the container 115 pointing towards the vehicle occupant forms a covering 8 which is adapted to be torn open in order to allow a gas bag (indicated by 116 in the figures) to emerge, which is housed inside the container. In addition, inside the container 115 a gas generator 112 is housed, which is fastened by its generator flange 113 to the module housing 114, the container 115 and the gas bag 116 also being fastened between the generator flange 113 and the module housing 114.

On an upper edge 120 of the module housing 114, in the region of the spokes of the steering wheel and preferably symmetrically to the left and right, one radial extension 124 each is constructed, to which is fastened a carrier 134 for a first switch 2 and for a second switch 132. The switches 2, 132 are each provided with a push rod 150 or 200, which can be pressed for actuation of the switch.

The carrier 134 preferably has a printed circuit board, on the upper side of which the first switch 2 is arranged with upwardly pointing push rod 150, and on the underside of which the second switch 132 is arranged with downwardly pointing push rod 200. The second switch 132 projects through an opening in the extension 124, so that the push rod 200 can lie against a flat contact surface 160 constructed in the foamed casing of the steering wheel skeleton 122, which contact surface 160 extends under the extension 124 substantially perpendicularly to the longitudinal axis of the vehicle steering wheel.

Likewise provided on the extension 124 is a first actuating element in the form of a push button 4 which can be displaced in actuating direction B. The button 4 has on its underside facing the printed circuit board 134 at least one rib 140 which, when being displaced, can actuate the switch 2 via the push rod 150.

The switch 2 serves for triggering a so-called multifunction feature, for example for the operation of on-board computer, radio, navigation system or the like, so that the button 4 and the switch 2 together are part of a multifunction switch unit, of which only one button/switch combination is illustrated in the section of FIG. 1. The multifunction switch unit can, however, have several such button/switch combinations which can be arranged one behind the other. According to the invention, at least the rib 140 of one button 4 has a stop element in the form of a downwardly protruding projection 9, which extends through an opening in the extension 124.

Figure 2:
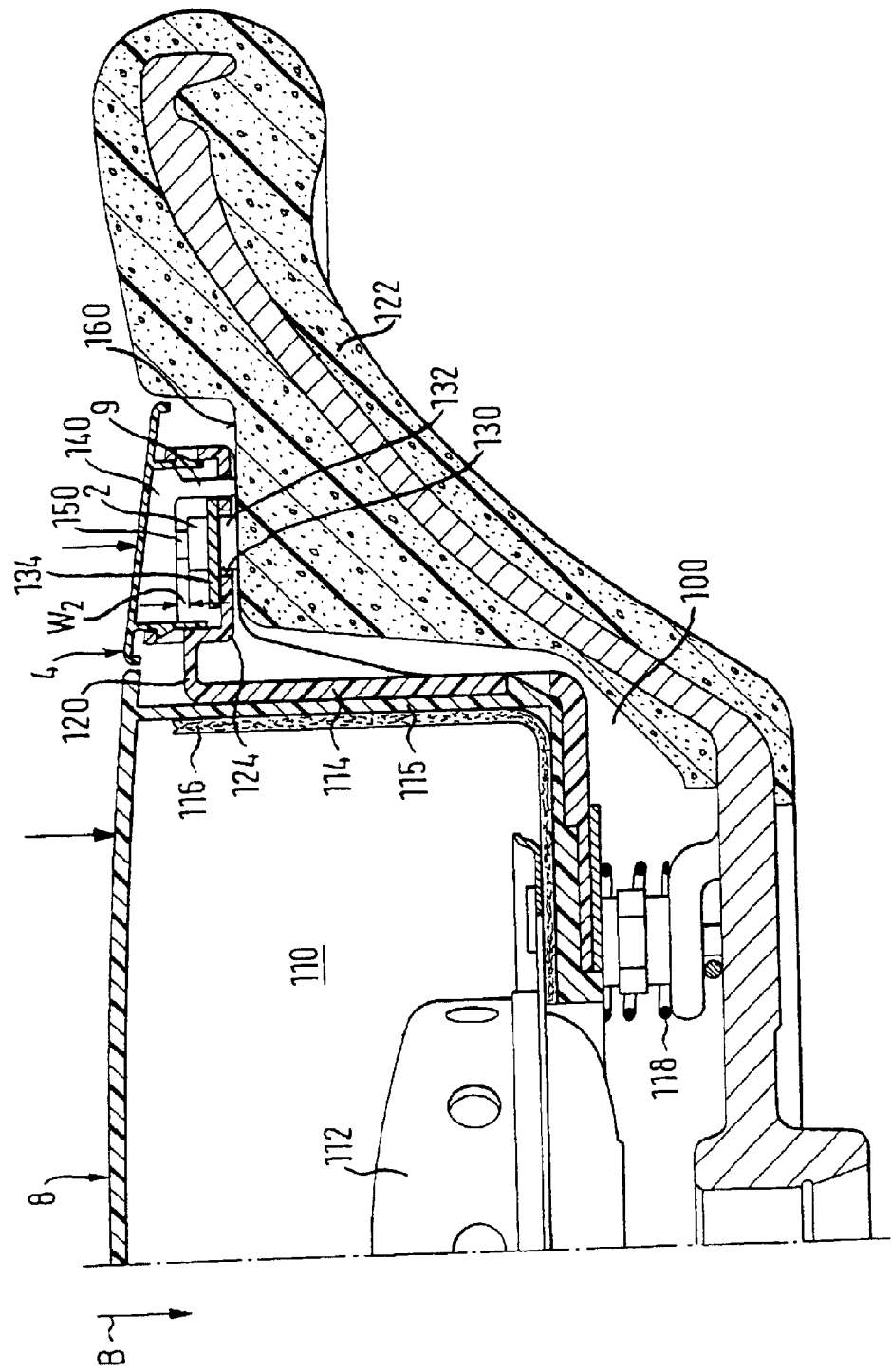
FIG. 2 shows the steering wheel according to FIG. 1 with the horn actuated.

The switch 132 serves as horn contact switch for triggering the horn. For its actuation, a force must be exerted onto covering 8, and namely in the actuating direction B. Thereby, the displaceably mounted module housing 114 is moved from its position of rest, as is illustrated in FIG. 1, into the actuating position which is illustrated in FIG. 2, the carrier 134 of course also being entrained in the actuating direction. Here, the horn contact switch 132 is actuated via the push rod 200 by the contact surface 160. In order to achieve as short an actuation path as possible, the push rod 200 preferably already lies against the stop surface 160 in the position of rest, as is illustrated in FIG. 1.

After the releasing of the covering 8, the module housing 114 returns into the position of rest again as a result of a restoring force exerted by restoring springs 118.

Figure 3:
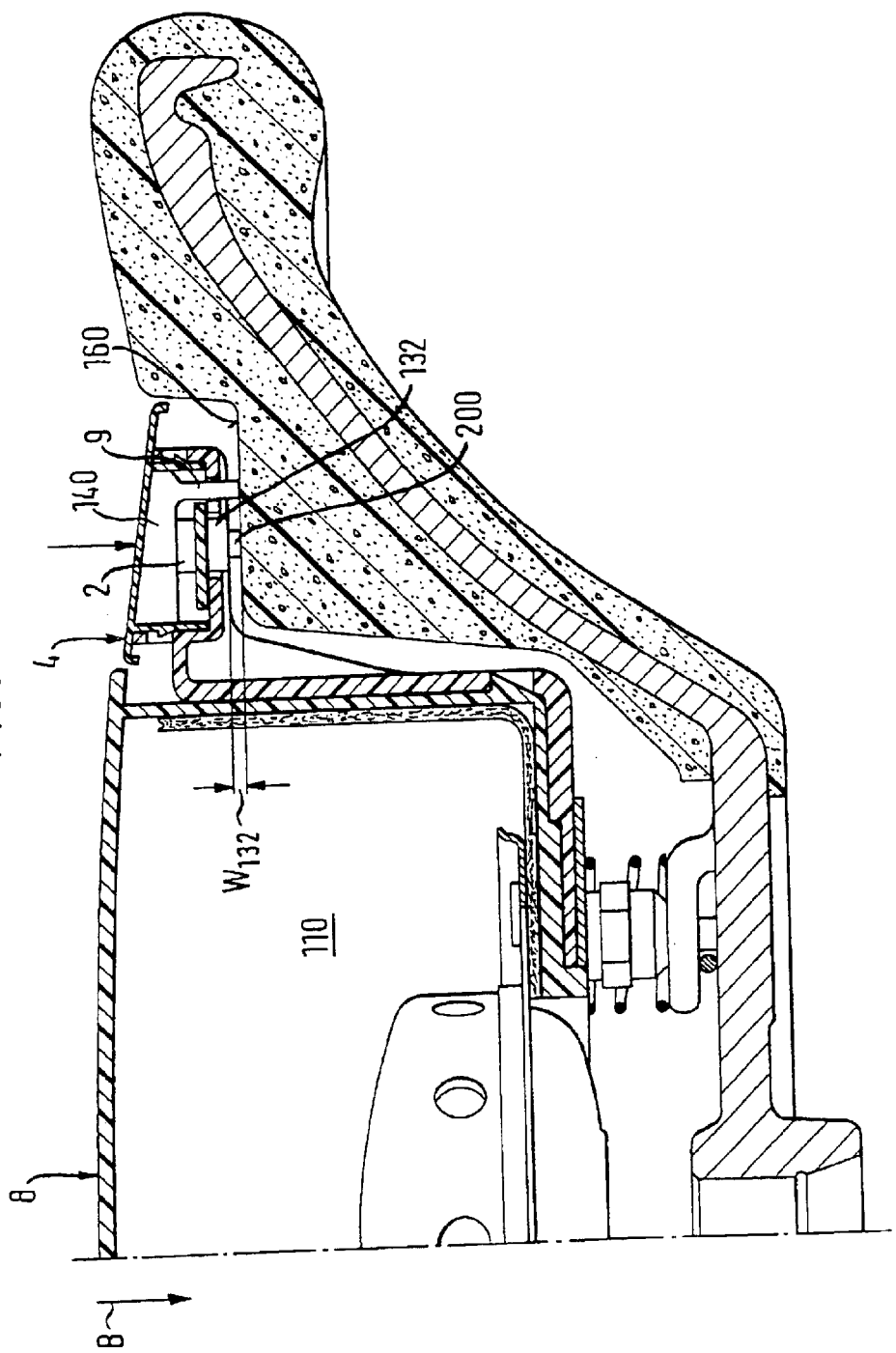
FIG. 3 shows the steering wheel according to FIG. 1 with the multifunction switch unit pressed.

If, as illustrated in FIG. 3, the button 4 for triggering a multifunction feature is pressed downwards in actuating direction B, the associated switch 2 is actuated by the rib 140 through the push rod 150. After the actuating path $W_2$ (see FIG. 2) of the switch 2 has been covered, which in the illustrated embodiment amounts to 1.5 mm for example, the projection 9 comes into abutment against the contact surface 160. Therefore the button 4 can not be pressed further downwards. Thereby, in fact, it is reliably prevented that with further pressing of the button 4 the module housing 114 is displaced and, hence, that the horn contact 132 would be actuated in error by "over-pressing" the button 4.

The actuating path $W_{132}$ of the horn contact switch 132 preferably corresponds to the actuating path $W_2$ of the switch 2 of the multifunction switch unit, so that the carrier 134 on actuation of the switch 2 is under no circumstance set into motion.

Of course, the switch 2 is also equipped with a restoring spring. The force of this restoring spring is, however, substantially less than that of the restoring spring 118, so that on pressing the button 4 firstly the restoring spring is compressed in the switch 2.

If the case occurs where the horn is to be triggered by pressing the covering 8, whilst at the same time the button 4 is pressed, it can occur that through the downward movement of the module housing 114 and the displacement of the carrier 134 connected therewith, the actuation of the switch 2 is discontinued, because the button 4 is prevented—by the projection 9 abutting against the stop surface 160—from following the downward movement of the carrier 134. This can, however, be entirely desirable, because no actuation of the multifunction switch units is to be undertaken by the driver, when quite obviously a dangerous traffic situation is present, which has caused him to sound the horn.

The switches 2, 132 are illustrated in the described embodiment as microswitches, which can be constructed for example as normally open or normally closed contacts, or combinations thereof. However, other embodiments are also conceivable, in which the switches 2 are e.g. represented by reed contacts or simple contact pairs, of which one contact can be arranged on the printed circuit board 134, and the respectively other on the actuating element or on an intermediate element displaceable by this.

In the described embodiment, the first actuating element 4 is mounted on the extension 124 of the module housing 114 and is therefore displaceable relative to the carrier 134. Alternatively, the first actuating element could also be mounted directly on the carrier or else on the base body.

The invention therefore provides a combination of multifunction switch unit and floating horn gas bag module, which does not require a separate switch carrier for movement uncoupling and nevertheless rules out the possibility of an unintentional sounding of the horn on actuating multifunction switches.

What is claimed is:

1. A vehicle steering wheel comprising:
   a first switch (2);
   a first actuating element (4) for actuating said first switch (2);
   a second switch (132);
   a second actuating element (110) or actuating said second switch (132);
   a carrier (134) displaceable by said second actuating element (110) in a actuating direction (B) for actuating said second switch (132) and on which said first switch (2) is mounted; and
   a base body (122), relative to which said carrier (134) is mounted so as to be displaceable in said actuating direction (B), said first actuating element (4) being provided with a stop element (9) which abuts against said base body (122) when said first actuating element (110) is displaced up to a complete actuation of said first switch (2), and which prevents a displacement of said carrier (134), caused by said first actuating element (4) which displacement would lead to an actuation of said second switch (132).

2. A vehicle steering wheel comprising:
   a first switch (2);
   a first actuating element (4) for actuating said first switch (2);
   a second switch (132);
   a second actuating element (110) for actuating said second switch (132);

a carrier (134) displaceable by said second actuating element (110) in an actuating direction (B) for actuating said second switch (132) and on which said first switch (2) is mounted; and a base body (122) for mounting said carrier (134) for displacement in said actuating direction (B), said first actuating element (4) being provided with stop element (9) abutting said base body (122) when said first actuating element (110) is displaced through a complete actuation of said first switch (2), said stop element (9) preventing a displacement of said carrier (134) causing an actuation of said second switch (132), said second actuating element being a floating horn gas bag module (110) displaceably mounted in said vehicle steering wheel.

3. A vehicle steering wheel comprising:

a first switch (2);

a first actuating element (4) for actuating said first switch (2);

a second switch (132);

a second actuating element (110) for actuating said second switch (132);

a carrier (134) displaceable by said second actuating element (110) in an actuating direction (B) for actuating said second switch (132) and on which said first switch (2) is mounted; and a base body (122) for mounting said carrier (134) for displacement in said actuating direction (B), said first actuating element (4) being provided with stop element (9) abutting said base body (122) when said first actuating element (110) is displaced through a complete actuation of said first switch (2), said stop element (9) preventing a displacement of said carrier (134) causing an actuation of said second switch (132), said carrier (134) being fastened to a lateral extension (124) of said gas bag module (110).

4. The vehicle steering wheel according to claim 3, characterized in that said first actuating element (4) is mounted on said lateral extension (124) of said gas bag module so as to be displaceable relative to said carrier (134).

5. A vehicle steering wheel comprising:

a first switch (2);

a first actuating element (4) for actuating said first switch (2);

a second switch (132);

a second actuating element (110) for actuating said second switch (132);

a carrier (134) displaceable by said second actuating element (110) in an actuating direction (B) for actuating said second switch (132), said carrier (134) being displaceably mounted on said vehicle steering wheel, said first switch (2) being mounted on said carrier (134); and a base body (122) for mounting said carrier (134) for displacement in said actuating direction (B), said first actuating element (4) being provided with a displaceable stop element (9) distanced from said base body (122) when said first switch (2) is in a non-actuated state, said displaceable stop element (9) abutting said base body (122) when said first actuating element (110) is displaced up to a complete actuation of said first switch (2), said displaceable stop element (9) preventing a displacement of said carrier (134) caused by said first actuating element (4) thereby preventing an actuation of said second switch (132).

6. The vehicle steering wheel according to claim 5, characterized in that said actuating elements (4, 110) are mounted in said base body (122).

7. The vehicle steering wheel according to claim 5, characterized in that said first actuating element (4) is displaceably mounted relative to said carrier (134).

8. The vehicle steering wheel according to claim 5, characterized in that said carrier has a printed circuit board (134).

9. The vehicle steering wheel according to claim 5, characterized in that said carrier (134) has an upper side and an underside and said first switch (2) is arranged on said upper side and said second switch (132) is arranged on said underside.

10. The vehicle steering wheel according to claim 5, characterized in that said base body (122) is formed by a steering wheel skeleton with a foamed casing, and that on displacement of said first actuating element (4), said stop element (9) comes to abutment against a stop surface (160) of said foam casing.

11. The vehicle steering wheel according to claim 5, characterized in that said first actuating element is a button (4) for a multifunction switch (2).

12. The vehicle steering wheel according to claim 5, characterized in that said second switch is a horn contact switch (132).

13. The vehicle steering wheel according to claim 5, characterized in that said stop element is a projection (9) constructed on said first actuating element (4).

\* \* \* \* \*

UNITED STATES PATENT AND TRADEMARK OFFICE
CERTIFICATE OF CORRECTION

PATENT NO. : 6,849,816 B2
DATED : February 1, 2005
INVENTOR(S) : Dieter Rumpf

It is certified that error appears in the above-identified patent and that said Letters Patent is hereby corrected as shown below:

Column 4,
Line 44, before "actuating" change "or" to -- for -- (second occurrence)
Line 47, after "in", change "a" to -- an --.

Column 5,
Lines 7 and 31, after "with" insert -- a --.

Signed and Sealed this

Thirty-first Day of May, 2005

JON W. DUDAS
*Director of the United States Patent and Trademark Office*